US011817773B2

(12) United States Patent
Drda et al.

(10) Patent No.: US 11,817,773 B2
(45) Date of Patent: Nov. 14, 2023

(54) SYSTEMS AND METHODS OF ADJUSTING SLOPE COMPENSATION

(71) Applicant: SEMICONDUCTOR COMPONENTS INDUSTRIES, LLC, Phoenix, AZ (US)

(72) Inventors: Vaclav Drda, Valasska Bystrice (CZ); Roman Stuler, Karolinka (CZ)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 460 days.

(21) Appl. No.: 16/852,766

(22) Filed: Apr. 20, 2020

(65) Prior Publication Data
US 2021/0328499 A1 Oct. 21, 2021

(51) Int. Cl.
*H02M 1/12* (2006.01)
*H02M 1/08* (2006.01)
*H02M 1/00* (2006.01)

(52) U.S. Cl.
CPC .............. *H02M 1/12* (2013.01); *H02M 1/08* (2013.01); *H02M 1/0009* (2021.05)

(58) Field of Classification Search
CPC ....... H02M 1/12; H02M 1/0029; H02M 3/156
See application file for complete search history.

(56) References Cited

U.S. PATENT DOCUMENTS

| 7,965,070 | B2 * | 6/2011 | Nakahashi | ............ | H02M 3/156 323/285 |
| 2012/0293156 | A1 * | 11/2012 | Galbis | ................. | H02M 3/1588 323/350 |
| 2013/0043850 | A1 * | 2/2013 | Zhu | ........................ | H02M 3/156 323/271 |

(Continued)

OTHER PUBLICATIONS

Grote, T. et al., "Adaptive Digital Slope Compensation for Peak Current Mode Control," IEEE Publication No. 978-1-4244-2893-9/09, Sep. 2009, pp. 3523-3529, Copyright 2009 IEEE.

(Continued)

*Primary Examiner* — Alex Torres-Rivera
(74) *Attorney, Agent, or Firm* — Dickinson Wright PLLC; Mark E. Scott

(57) ABSTRACT

Adjusting slope compensation. At least one example embodiment is a method including: operating a switching power converter comprising a charge control switch, the charge control switch configured to control power flow through the switching power converter, and the operating by a circuit controller; measuring, by the circuit controller, an attribute of duty cycle of a first period of the charge control switch; measuring, by the circuit controller, an attribute of duty cycle of a second period of the charge control switch; measuring, by the circuit controller, an attribute of duty cycle of a third period of the charge control switch; determining, by the circuit controller, that the switching power converter is experiencing subharmonic oscillation based on the first, second, and third attributes of duty cycle; and (Continued)

changing, by the circuit controller, an attribute of slope compensation responsive to the determining that the switching power supply is experiencing subharmonic oscillation.

20 Claims, 5 Drawing Sheets

(56)  References Cited

U.S. PATENT DOCUMENTS

2013/0135775 A1\* 5/2013 Yao .................. H02H 9/025
                                                        361/18
2014/0063856 A1\* 3/2014 Huang .............. H02M 3/33515
                                                        363/16

OTHER PUBLICATIONS

"High Performance Current Mode Controllers," ON Semiconductor Product Description Publication No. UC3842A/D, Nov. 2005—Rev. 8, 18 pages, Copyright 2005 Semiconductor Components Industries, LLC.
"Current Mode Resonant Controller, with Integrated High-Voltage Drivers, High Performance," ON Semiconductor Product Description Publication No. NCP1399/D, Oct. 2019—Rev. 17, 45 pages, Copyright Semiconductor Components Industries, LLC, 2016.
"Current-Mode PWM Controller for Off-line Power Supplies featuring Peak Power Excursion," ON Semiconductor Product Description Publication No. NCP1255/D, Sep. 2015—Rev. 2, 28 pages, Copyright Semiconductor Components Industries, LLC 2015.

\* cited by examiner

SYSTEMS AND METHODS OF ADJUSTING SLOPE COMPENSATION

CROSS-REFERENCE TO RELATED APPLICATIONS

Not Applicable.

BACKGROUND

Switching power converters that use peak current control may exhibit subharmonic oscillation at duty cycles greater than 50%. Slope compensation may be used to suppress the subharmonic oscillation, but the amount of slope compensation differs based on the type of switching power converter. For example, the slope compensation used to suppress subharmonic oscillation in a non-isolated buck-type converter may be different than the slope compensation used to suppress subharmonic in an inductor-inductor-capacitor (LLC) resonant converter. Different slope compensation gain may also be used within one group of converters depending upon the inductor value used and switching frequency.

Related-art controllers for switching power converters have a dedicated pin or terminal that is coupled to external components to set the slope or gain of a ramp signal used within the controllers to implement the slope compensation. Not only does the dedicated terminal increase the pin count for the controller, but also forces the circuit designer to derive and verify the amount of slope compensation used, which increases complexity of the design and increases the bill-of-materials count for the overall switching power converter.

BRIEF DESCRIPTION OF THE DRAWINGS

For a detailed description of example embodiments, reference will now be made to the accompanying drawings in which.

DEFINITIONS

Figure 1:
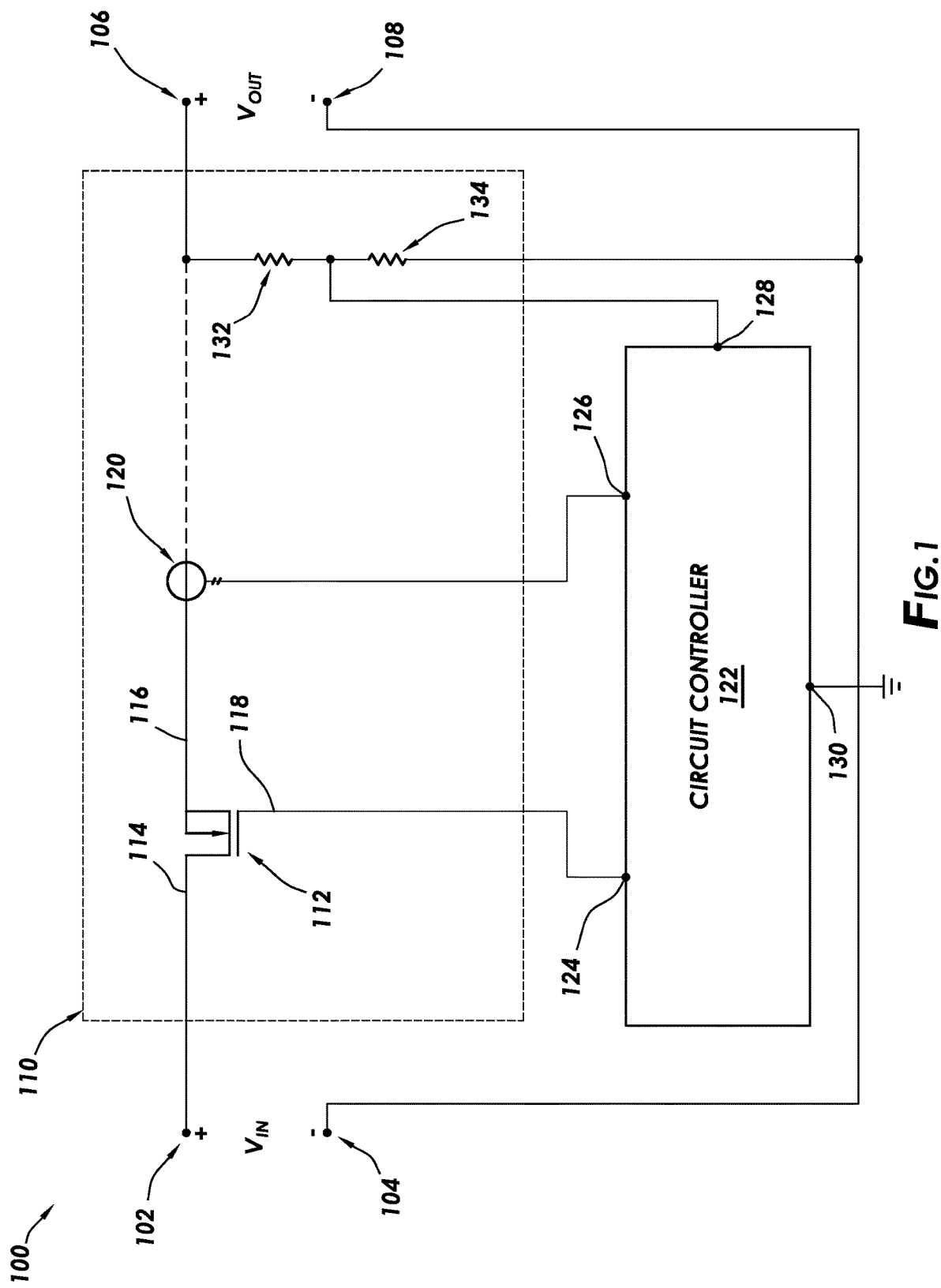
FIG. 1 shows an electrical schematic of a switching power converter in accordance with at least some embodiments.

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection or through an indirect connection via other devices and connections.

In relation to electrical devices (whether stand alone or as part of an integrated circuit), the terms "input" and "output" refer to electrical connections to the electrical devices, and shall not be read as verbs requiring action. For example, a differential amplifier (such as an operational amplifier) may have a first differential input and a second differential input, and these "inputs" define electrical connections to the operational amplifier, and shall not be read to require inputting signals to the operational amplifier.

"Controller" shall mean, alone or in combination, individual circuit elements, an application specific integrated circuit (ASIC), a microcontroller with controlling software, a digital signal processor (DSP), a processor with controlling software, or a field programmable gate array (FPGA), configured to read inputs and drive outputs responsive to the inputs.

"Assert" shall mean changing the state of a Boolean signal. Boolean signals may be asserted high or with a higher voltage, and Boolean signals may be asserted low or with a lower voltage, at the discretion of the circuit designer. Similarly, "de-assert" shall mean changing the state of the Boolean signal to a voltage level opposite the asserted state.

"Attribute of duty cycle" may be, for example, duty cycle (e.g., ratio of on-time over off-time), on-time, off-time, or inverse duty cycle (e.g., ratio of off-time over on-time).

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Various example embodiments are directed to systems and methods of adjusting slope compensation. More particularly, example embodiments are directed to switching power converters that sense the presence of subharmonic oscillation, and automatically adjust the slope compensation to reduce or eliminate the subharmonic oscillations. More particularly still, example embodiments sense subharmonic oscillation of the switching power converter based on attributes of duty cycle of the assertions of the control input of a charge control switch. For example, a circuit controller driving the control input of a charge control switch may sense duty cycle over a plurality of periods of the switching frequency. Patterns of duty cycle changes, such as long-short-long or short-long-short, are indicative of subharmonic oscillations. When subharmonic oscillations are sensed, the circuit controller may adjust an attribute of a ramp signal used to implement the slope compensation. The specification now turns to a high-level system to orient the reader.

FIG. 1 shows an electrical schematic of a switching power converter in accordance with at least some embodiments. In particular, the example switching power converter 100 comprises input nodes defining a positive node 102 and a negative node 104. The input voltage $V_{IN}$ is coupled across the input nodes in the polarity indicated. The switching power converter 100 includes output nodes defining a positive node 106 and a negative node 108. The switching power converter creates an output voltage $V_{OUT}$ across the output nodes in the polarity indicated.

The switching power converter 100 further comprises a power circuit 110 that may take many forms. For example, the power circuit 110 may comprise components to implement an isolated switching power converter, a non-isolated switching power converter, a buck-type switching power converter, a boost-type switching power converter, a switching power converter arranged for flyback operation, and an inductor-capacitor resonant switching power converter (e.g., an LLC resonant converter). The various embodiments of automatically adjusting the slope compensation may be applicable across all the example switching power converter types, and thus FIG. 1 shows a simplified system for purposes of explanation.

In particular, the power circuit 110 comprises an electrically controlled switch 112 that controls power flow from the input voltage $V_{IN}$ to the output voltage $V_{OUT}$. The electrically controlled switch may be a transistor. In many cases, the electrically controlled switch 112 is a field effect transistor (FET). Hereafter the electrically controlled switch is referred to as charge control FET 112 with the understanding other types of transistors, and other types of electrically controlled switches, may be used. The charge control FET 112 defines a first connection or drain 114, a second connection or source 116, and a control input or gate 118. The drain 114 is coupled to the positive node 102 of the input voltage $V_{IN}$. The source 116 is coupled to the positive node 106 of the output voltage $V_{OUT}$ through various additional circuit components that depend on the type of switching power converter implemented, hence the dashed line within the power circuit 110 between the charge control FET 112 and the output voltage $V_{OUT}$.

Example embodiments may be implemented in switching power converters that implement current-mode control, and in particular that implement peak current-mode control as the mechanism to control the conduction time of the charge control FET 112. Thus, in the circuit of FIG. 1 current through the charge control FET 112 may be measured by an example current transformer 120. While the example system of FIG. 1 shows use of a current transformer, any signal indicative of current flow may be used, such as current flow through a sense resistor (e.g., a sense resistor on the primary side in a flyback power converter).

The example switching power converter 100 further comprises a circuit controller 122. The circuit controller 122 defines a drive or gate terminal 124, a sense terminal 126, a feedback terminal 128, and a common or ground terminal 130. The gate terminal 124 is coupled to the gate 118 of the charge control FET 112. The sense terminal 126 in the example system is coupled to the current transformer 120. The feedback terminal 128 is coupled to the output voltage $V_{OUT}$ by way of a middle node of a voltage divider circuit comprising a resistor 132 and a resistor 134. The ground terminal 130 is coupled to the negative node 108 of the output voltage $V_{OUT}$.

In operation, the charge control FET 112 charges an inductance (not specifically shown) by becoming conductive and thus applying the input voltage $V_{IN}$ to the inductance, the charging sometimes referred to as the charge mode. In the case of a non-isolated buck converter, the inductance is an inductor arranged for buck operation. In the case of an isolated buck converter (e.g., forward converters, LLC converters, and flyback converters) the inductance may be the windings of a transformer, and in some cases an inductor on the primary side of the transformer (e.g., LLC converter) or secondary side of the transformer (e.g., forward converter). During the charge mode the current through the charge control FET 112 builds over time. When the current through the charge control FET 112 reaches a set point peak current, the charge control FET 112 becomes non-conductive. When the charge control FET 112 is non-conductive, energy stored in the inductance is discharged to provide power to the load, the discharging sometimes referred to as the discharge mode.

Any one of a number of operational techniques may be used to control power flow through the charge control FET 112. For example, the frequency of the gate signal applied to the gate 118 of the charge control FET 112 may change with changing load, in some cases the frequency decreasing with increasing load and the frequency increasing with decreasing load, such as in LLC converters. In other cases, the frequency may be fixed, and the duty cycle of the gate signal applied to the gate 118 of the charge control FET 112 changes with changing load. In such cases, the duty cycle increases with increasing load, and the duty cycle decreases with decreasing load, such as in non-isolated buck converters and isolated buck converters.

Figure 2:
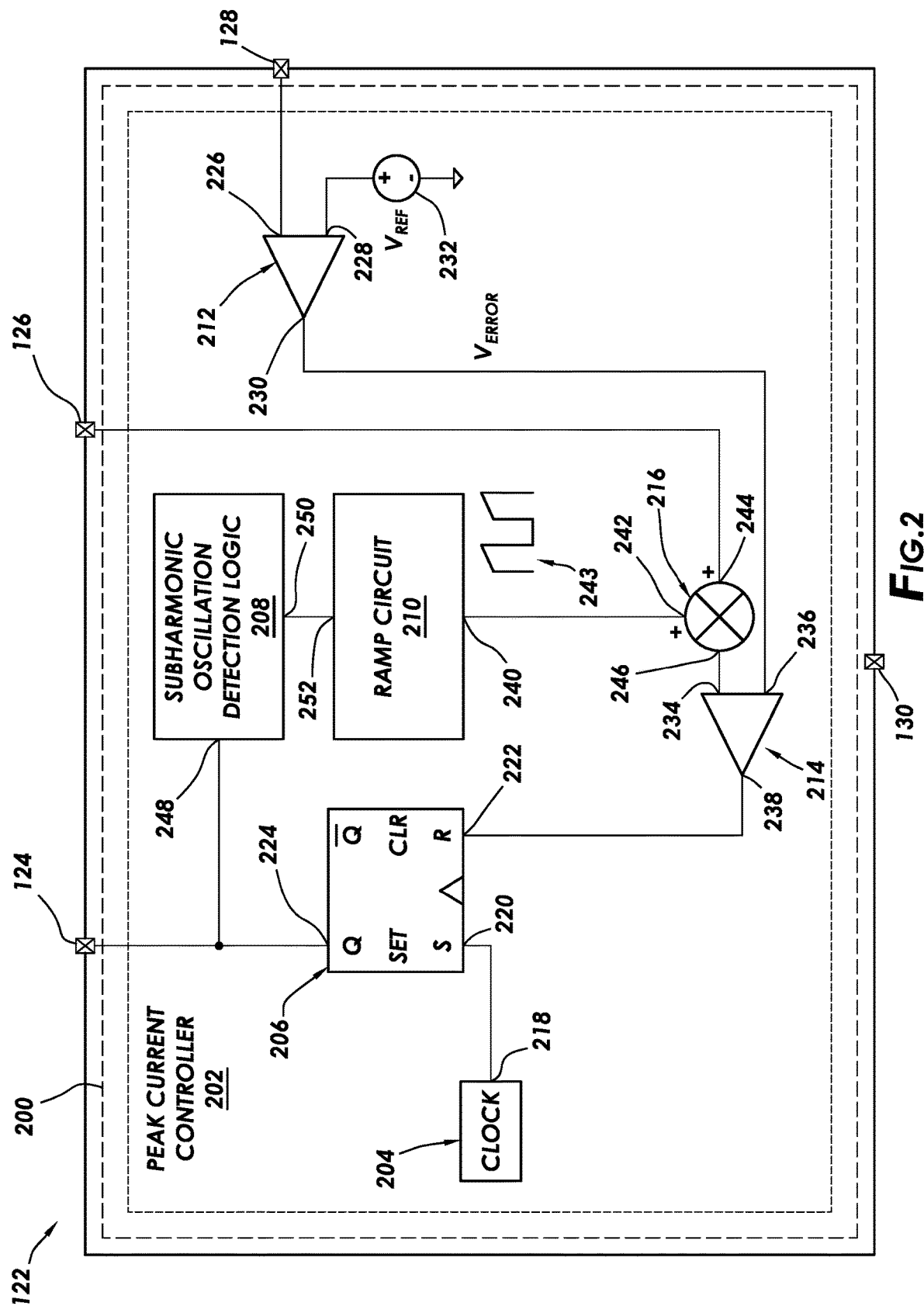
FIG. 2 shows a block diagram of a circuit controller in accordance with at least some embodiments.

FIG. 2 shows a block diagram of a circuit controller 122 in accordance with at least some embodiments. In particular, the example circuit controller 122 is a packaged semiconductor device or packaged integrated circuit device having a plurality of externally accessible pins or terminals. Visible in FIG. 2 are the gate terminal 124, the sense terminal 126, the feedback terminal 128, and the ground terminal 130. The ground terminal 130 is not shown connected to all the various circuits within the circuit controller 122 so as not to unduly complicate the figure, but such would be present in practice. Various other terminals would be present (e.g., power terminal, additional sensing terminals, tuning terminals), but the additional terminals are not shown so as not to unduly complicate the figure. Within the packaged device resides a semiconductor die 200 upon which the various electrical circuits are monolithically constructed. While FIG. 2 shows only a single semiconductor die 200, two or more semiconductor dies may be packaged together (e.g., a multi-chip module) to create the circuit controller 122.

The example circuit controller 122 implements a peak current controller 202. The peak current controller 202 is coupled the gate terminal 124, the sense terminal 126, the feedback terminal 128, and the ground terminal 130. The peak current controller 202 is configured to assert the gate terminal 124 with a pulse signal having a switching frequency. The switching frequency may be conceptually divided into periods defined by consistent consecutive features of the pulse signal. For example, the time between two consecutive rising edges of the pulse signal may define the period, or the time between two consecutive falling edges of the pulse may define the period. In example cases the peak current controller 202 is configured to assert the gate terminal 124 at the switching frequency, and to de-assert the gate terminal in each period of the switching frequency based on: a signal indicative of current sensed through the sense terminal 126; a signal indicative of voltage error created based on a signal sensed through the voltage feedback terminal 128; and a ramp signal. In example embodiments, the peak current controller 202 is configured to sense subharmonic oscillation of the switching power converter based on attributes of duty cycle of the assertions of the gate terminal 124 over a plurality of periods of the switching frequency. The peak current controller 202 is further configured to change an attribute of a ramp signal responsive to detection of the subharmonic oscillation, where the ramp signal is the mechanism by which the circuit controller 122 implements slope compensation.

The implementation of the peak current controller 202 asserting the gate terminal 124 in each period, de-asserting the gate terminal 124 in each period, monitoring for and detecting subharmonic oscillations, and taking actions responsive to the presence of subharmonic oscillations may take many forms. In some cases, the implementation may be programmatic, such as by software executing on a processor or microcontroller implemented within the peak current controller 202. In the programmatic case, the external analog signals may be converted to digital form by way of analog-to-digital converters. Oppositely, the implementation may be purely by way of analog and digital components implemented within the peak current controller 202. Further still, some aspects may be implemented programmatically (e.g., the monitoring for and detection of the subharmonic oscillation, and creating the ramp signal), and other aspects may be implemented in analog format, such as creating a voltage error signal, and combining the ramp signal with an appropriate signal to implement the slope compensation. The discussion that follows regarding the implementation shows functionally what may happen, but should not be read to require any particular type of implementation.

Still referring to FIG. 2, the example circuit controller 122, and particularly the example peak current controller 202, may comprise a clock circuit 204, a latch 206, a subharmonic oscillation detection logic 208, a ramp circuit 210, an error amplifier 212, a comparator 214, and a summation block 216. In the example case of FIG. 2, during operation the clock circuit 204 produces a clock signal with a predetermined switching frequency. The clock circuit 204 thus defines a clock output 218 upon which the clock signal is driven. In the configuration shown, the circuit controller 122 may thus be designed for controlling switching power converters that operate at a fixed frequency, such as isolated and non-isolated buck converters, including flyback converts. When the circuit controller 122 is arranged for operating other types of switching power converters, such as LLC resonant converters, the clock circuit 204 may produce a variable frequency drive signal, where the frequency is selected based on other sensed parameters, such as voltage at a switching node between the upper and lower FETs in the primary circuit.

The example latch 206 defines a set input 220, a reset input 222, and latch output 224. Thus, the example latch 206 is set-reset latch; however, other latch types may be used. The latch output 224 is coupled to the gate terminal 124, and the set input is coupled to the clock output 218 of the clock circuit 204. The example latch 206 thus asserts the latch output 224 and gate terminal 124 each time the clock signal from the clock circuit 204 is asserted, each assertion starting a charge mode of the overall switching power converter. The latch output 224 is reset or de-asserted based on assertion of the reset input 222, discussed more below.

The example circuit controller 122, and particularly the peak current controller 202, creates a voltage error signal that is used to create the set point peak current during each charge mode. In particular, the error amplifier 212 defines a first input 226, a second input 228, and an error output 230. The first input 226 is coupled to the feedback terminal 128, and thus receives a signal indicative of output voltage. In some cases, and as shown in FIG. 1, the signal indicative of output voltage is a scaled version of the output voltage. In other cases, such as an isolated converter with the circuit controller 122 operating on the primary side, the signal indicative of output voltage may not only be scaled, but also an inverted signal, such as created by optocoupler, such that as output voltage $V_{OUT}$ goes up, the signal indicative of output voltage goes down, and vice versa. The second input 228 of the error amplifier 212 is coupled to a reference voltage $V_{REF}$ 232 that is representative of the of the set point output voltage (taking into account the scaling). The error amplifier 212 thus drives a voltage error signal on the error output 230. As discussed more below, the voltage error signal may be used to set the peak current in each period at which the latch 206 is reset, thus de-asserting the gate terminal 124.

Comparator 214 defines a first input 234, a second input 236, and a compare output 238. The compare output 238 is coupled to the reset input 222 of the latch 206, and thus when the compare output 238 is asserted, the latch 206 de-asserts the latch output 224 and thus the gate terminal 124. The second input 236 is coupled to the error output 230 of the error amplifier 212, and thus the second input 236 receives the voltage error signal. Ignoring for the moment the summation block 216, the first input 234 is coupled to the sense terminal 126, and thus first input 234 receives a signal indicative of current through the charge control FET 112 (FIG. 1).

In operation, the clock circuit 204 asserts the set input 220 of the latch 206 at the beginning of each period of the switching frequency. Current through the charge control FET 112 (FIG. 1) builds over time, and thus the magnitude of the signal indicative of current applied to the first input 234 of the comparator 214 builds over time. When the magnitude of the signal indicative of current transitions through the magnitude of the voltage error signal, the comparator 214 asserts the compare output 238, thus de-asserting the gate terminal 124, ending the charge mode of the switching power converter, and beginning the discharge mode of the switching power converter. The next charge mode begins at the next period of the switching frequency.

Switching power converters operated in the peak current-mode control may experience subharmonic oscillations when the duty cycle of the signal applied to the gate terminal 124 and the charge control FET 112 rises about 0.5 or 50%. In order to reduce or eliminate such subharmonic oscillations, the example circuit controller 122 implements slope compensation in the form of the ramp circuit 210 and summing block 216. In particular, the ramp circuit 210 defines a ramp output 240 upon which a ramp signal is driven. The ramp signal is a periodic signal, and an example ramp signal 243 is embedded within the figure. The example ramp signal 243 is a voltage or current ramp that starts the ramp anew in each period of the switching frequency of the clock signal. The ramp rate or slope of the ramp signal controls the contribution of the ramp signal to the slope compensation. Higher ramp rates or greater slopes of the ramp signal increase the slope compensation. And oppositely, lower ramp rates or lower slopes of the ramp signal decrease the slope compensation.

In the example of FIG. 2, the slope compensation is implemented by adding the ramp signal to the signal indicative of current through the charge control FET. In particular, the summation block 216 defines a first input 242, a second input 244, and a sum output 246. The first input 242 is coupled to the ramp output 240 and thus receives the ramp signal. The second input 244 is coupled to the sense terminal 126 and thus receives the signal indicative of current through the charge control FET. The sum output 246 is coupled to the first input 234 of the comparator 214. In the example system, summation block 216 sums signals on the first input 242 and second input 244, and drives the sum to the sum output 246. The sum created by the summation block 216 may thus be considered a compensated current signal. It follows then that example peak current controller 202 of FIG. 2 de-asserts the gate terminal 124 in each period of the switching frequency when a magnitude of the compensated current signal applied to the first input 234 of the comparator 214 crosses a magnitude of the signal indicative of voltage error applied to the second input 236 of the comparator 214.

In example embodiments, the circuit controller 122, and particularly the peak current controller 202, is designed and constructed to sense subharmonic oscillation of the switching power converter based on attributes of duty cycle of the assertions of the gate terminal over a plurality of periods of the switching frequency. When subharmonic oscillation is detected, the peak current controller 202 is designed and constructed to change an attribute of the ramp signal created by the ramp circuit to reduce or eliminate the subharmonic oscillations. In particular, the example peak current controller 202 implements the subharmonic oscillation detection logic 208. The example subharmonic oscillation detection logic 208 defines a detection input 248 and a trigger output 250. The detection input 248 is coupled to the gate terminal 124, and thus receives the gate driver signal applied to the control input of the charge control FET 112. The trigger output 250 is coupled to a trigger input 252 of the ramp circuit 210.

Still referring to FIG. 2, in practice the circuit controller 122 operates a switching power converter comprising the charge control FET 112. During operation, the subharmonic oscillation detection logic 208 measures an attribute of duty cycle of a first period of the pulse signal applied to the gate terminal 124 (and thus the charge control FET 112). The subharmonic oscillation detection logic 208 then measures an attribute of duty cycle of a second period of the pulse signal applied to the gate terminal 124. The subharmonic oscillation detection logic 208 then measures an attribute of duty cycle of a third period of the pulse signal applied to the gate terminal 124. With three periods thus measured, the subharmonic oscillation detection logic 208 determines whether the switching power converter is experiencing subharmonic oscillation based on the first, second, and third attributes of duty cycle. When subharmonic oscillation is occurring, the subharmonic oscillation detection logic 208 changes an attribute of slope compensation, such as by asserting the trigger output 250. Responsive to the assertion of the trigger output 250, the ramp circuit 210 changes an attribute of the ramp signal applied to the summation block 216, such as increasing the slope of the ramp signal.

Detecting that the switching power converter is experiencing subharmonic oscillation may take many forms. In one example embodiment, the subharmonic oscillation detection logic 208 may sense the on-time or asserted time of the pulse signal (which corresponds to conduction time of the charge control FET 112) in each period as the attribute of duty cycle. In other cases, the subharmonic oscillation detection logic 208 may sense the off-time or de-asserted time of the pulse signal in each period as the attribute of duty cycle. The example subharmonic oscillation detection logic 208 may determine that the switching power converter is experiencing subharmonic oscillations by sensing a long attribute of duty cycle in the first period (e.g., long on-time), then a short attribute of duty cycle in the second period (e.g., short on-time), followed by another long attribute of duty cycle in the third period (e.g., long on-time again). The opposite situation may also be used as an indication of subharmonic oscillation, by sensing a short attribute of duty cycle in the first period (e.g., short on-time), then a long attribute of duty cycle in the second period (e.g., long on-time), followed by another short attribute of duty cycle in the third period (e.g., short on-time again).

Regardless of the attribute of duty cycle sensed, and regardless of the trigger pattern (e.g., long-short-long, or short-long-short), the relationship of the periods sensed and used in the determination may take many forms. For example, in some cases the first period is consecutive with the second period, and the second period is consecutive the third period. Subharmonic oscillation in many cases is at a frequency of about half of the switching frequency, and thus subharmonic oscillation may be determined by measuring an attribute of duty cycle in periods where the oscillation is likely to manifest itself. For example, the third period may be an Nth period after the second period, and the second period may be the Nth period after the first period, where N is an even integer.

Figure 3:
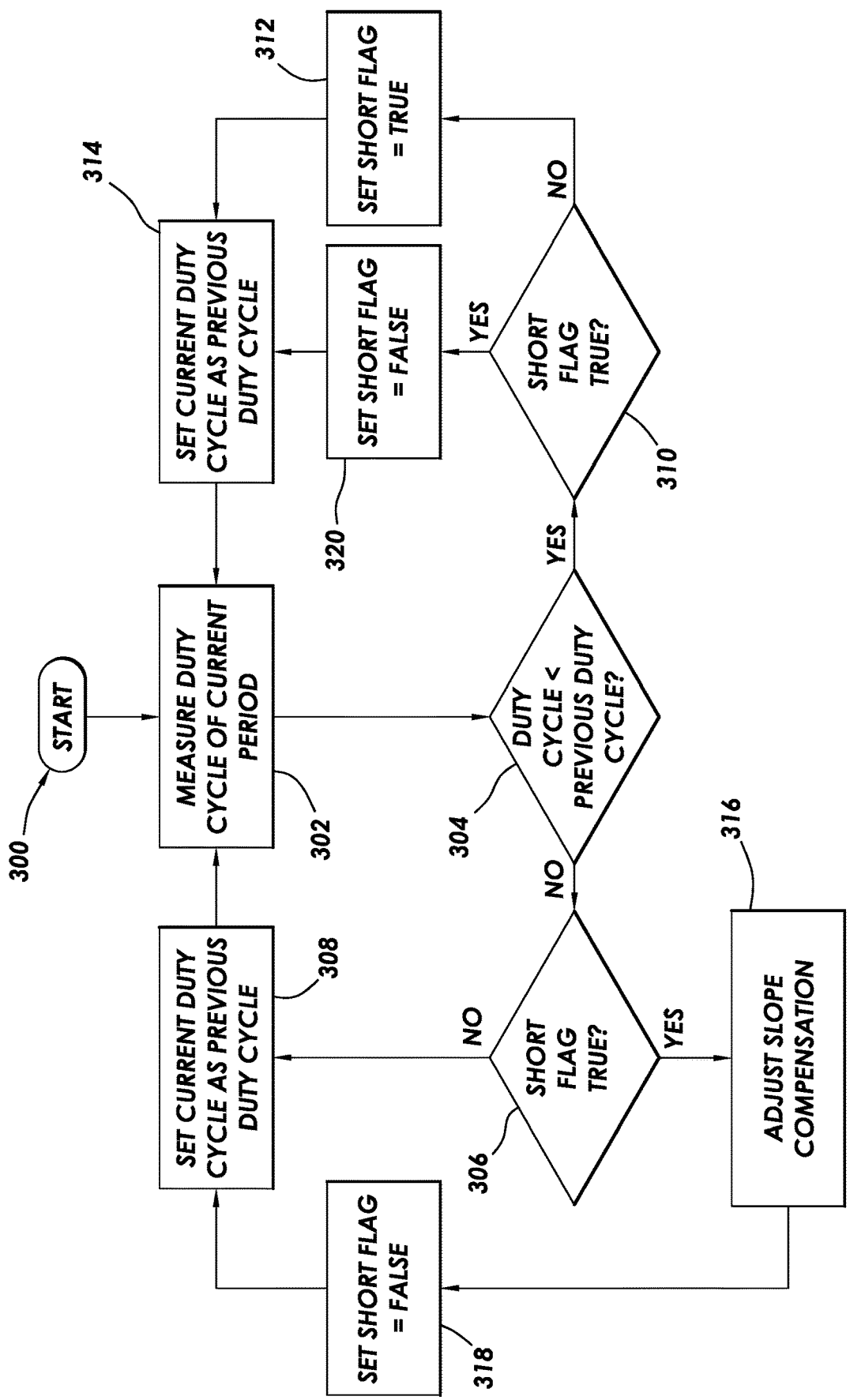
FIG. 3 shows an example flow diagram for detecting subharmonic oscillation in accordance with at least some embodiments.

FIG. 3 shows an example flow diagram for detecting subharmonic oscillation in accordance with at least some embodiments. In particular, FIG. 3 shows a method that may be implemented by the subharmonic oscillation detection logic 208. The example method is shown in reference to the attribute of duty cycle being duty cycle itself (e.g., the ratio of the asserted time of the pulse signal over the de-asserted time within one period). Moreover, the example method is shown in reference to detection of long-short-long sequence as indicative of subharmonic oscillation. With the benefit of this disclosure, one of ordinary skill could create a suitable method using a different attribute of duty cycle (e.g., on time, off time, the ratio of de-asserted time over asserted time). Similarly, with the benefit of this disclosure one of ordinary skill could create a suitable method using a different sequence (e.g., short-long-short).

The example method starts (block 300) and comprises measuring the duty cycle of the current period (block 302). The example method then proceeds to determining whether the duty cycle of the current period is less than the duty cycle of a previous period (block 304). Consider initially, and for purposes of explanation, that the switching power converter under consideration is operating in a steady state condition at constant load and is not experiencing subharmonic oscillations. Thus, the duty cycle in each period is same for these assumptions. The analysis at the decision block 304 regarding whether the duty cycle of the current period is less than the duty cycle of the previous period results in a "NO," and thus example method proceeds to the left. The next step in the example method is a determination as to whether a short flag has been previously set to true (block 306). Consider for now that the short flag is false, and thus the example method proceeds along the "NO" path. The next step in the example method is setting the duty cycle of the current period to be the previous duty cycle (block 308) for use in future periods.

Still consider that the switching power converter is operating in a steady state condition at constant load and is not experiencing subharmonic oscillations, the duty cycle in the next period (now the current period) is measured (again block 302). The example method then again proceeds to determining whether the duty cycle of the current period is less than the duty cycle of a previous period (block 304). Under the continued assumption of steady state operation with no subharmonic oscillation and thus near constant duty cycle, the analysis at the decision block 304 regarding whether the duty cycle of the current period is less than the duty cycle of the previous period again results in a "NO," and thus example method again proceeds to the left. As before, the short flag is still false, and thus the example method again proceeds to setting the duty cycle of the current period to be the previous duty cycle (block 308) for use in future periods. As long as the duty cycle remains constant, the example method thus circulates around the blocks 302, 304, 306, and 308 in the example method.

Now consider that the switching power converter experiences subharmonic oscillations, which cause the duty cycle in the current period to be much shorter than the previous duty cycle, as measured at block 302. The example method again proceeds to determining whether the duty cycle of the current period is less than the duty cycle of a previous period (block 304). Under the assumption, the analysis at the decision block 304 results in a "YES," and thus example method proceeds to the right. The next step in the example method is a determination as to whether the short flag has been previously set to true (block 310). Under the current assumptions, the short flag is still false, and thus the example method proceeds along the "NO" path. The next step in the example method is setting the short flag to be true (block 312), indicating the example method has seen a long-short transition or pattern. From there, the next step in the example method is setting the duty cycle of the current period to be the previous duty cycle (block 314) for use in future periods.

Still considering that the switching power converter is experiencing subharmonic oscillation, in the next period (now the current period) the duty cycle will be greater than the previous duty cycle, as measured at block 302. The example method then again proceeds to determining whether the duty cycle of the current period is less than the duty cycle of a previous period (block 304). Under the assumption, the analysis at the decision block 304 results in a "NO," and thus example method proceeds to the left. The next step in the example method is a determination as to whether a short flag has been previously set to true (block 310). Under the current assumptions, the short flag is true, and thus the example method proceeds along the YES path out of block 306. The example method has now seen a long-short-long sequence or pattern, which is indicative of subharmonic oscillations. Thus, the next step in the example method is adjusting the slope compensation (block 316) in an attempt to suppress the subharmonic oscillations. In some example cases, the adjustment comprises increasing the slope of the ramp signal created by the ramp circuit 210 (FIG. 2). From there, the short flag is set to false (block 318), and the duty cycle of the current period to be the previous duty cycle (block 308) for use in future periods.

Consider now that the adjustment to slope compensation made in the previous period was sufficient to fully suppress the subharmonic oscillations. It follows that the duty cycle in the next example period will be long again, and thus again the example method circulates around the blocks 302, 304, 306, and 308.

The adjustment to the slope compensation (block 316) may be an incremental adjustment. In some cases, the incremental adjustment may not fully suppress the subharmonic oscillations in one adjustment. Thus, consider that the example method experienced the long-short-long sequence and made an incremental adjustment to the slope compensation (at block 316), but in the next period (now the current period) the duty cycle is shorter than the previous duty cycle, as measured at block 302. Under the assumption, the analysis at the decision block 304 results in a "YES," and thus example method proceeds to the right. Under the current assumptions, the short flag is still false (analyzed at block 310), and thus the example method proceeds along the "NO" path. The short flag is set to be true (block 312), indicating the example method has seen another long-short transition or pattern. From there, the next step in the example method is setting the duty cycle of the current period to be the previous duty cycle (block 314) for use in future periods. Under the continued assumption of the presence of subharmonic oscillations, the next round through the method another adjustment to slope compensation will be made (again at block 316), and the cycle continues. The example method then incrementally increases the slope compensation, such as increasing the slope of the ramp signal, until subharmonic oscillation ceases.

Now consider a situation where the switching power converter is operating in a first state at a first load, and then the load drops such that the switching power converter transitions to steady state operation at the lower load. As the switching power converter transitions to the lower load condition, the duty cycle in each period gets successively shorter. Initially, and at the higher load, the example method circulates around the blocks 302, 304, 306, and 308. However, as the load the starts to drop and thus duty cycle gets shorter, each transition through the decision block 304 results in taking the "YES" path to the right. The first time through the short flag is false (block 310), and thus method sets the short flag to true (block 312). However, in the next period the decision block 304 again results in taking the "YES" path to the right, but since the short flag is now true (block 310), the example method takes the "YES" path out of block 310, and thus sets the short flag equal to false (block 320). Thus, as the load continues to drop, in successive periods the short flag alternates between being set to true and being set to false, but in neither case is any adjustment made to the slope compensation. Stated otherwise, in situations where load is dropping, the example method circulates around the right side of the example method. Assuming a critically damped response to the change in load, at some point the switching power converter reaches another steady state operating point in which the duty cycle in each period is the same, and at that point the method again circulates around the blocks 302, 304, 306, and 308.

Now consider a situation where the switching power converter is operating in a first state at a first load, and then the load increases such that the switching power converter transitions to steady state operation at the higher load. As the switching power converter transitions to the higher load condition, the duty cycle in each period gets successively longer. Initially, and at the lower load, the example method circulates around the blocks 302, 304, 306, and 308. As the duty cycle gets longer in each period, the example method continues to circulate around the blocks 302, 304, 306, and 308.

The designer of the overall switching power converter need not be concerned with slope compensation, as the circuit controller 122 arrives at a slope compensation suitable to reduce or suppress the subharmonic oscillations. Thus, the slope compensation is without reference to components external to the circuit controller 122. Moreover, The designer of the overall switching power converter need to not even program an initial contribution of the slope compensation, as the circuit controller 122 eventually finds the proper slope compensation. Moreover, as the values of various components of the switching power converter change with temperature and/or age, each time the circuit controller 122 finds the proper slope compensation.

Returning briefly to FIG. 2, the various embodiments discussed to this point have assumed that the ramp signal is summed with the signal indicative of current to create the compensated current signal. In such in embodiments, when subharmonic oscillations are detected, the increase in slope compensation affects the compensated current signal. For example, if the slope of ramp signal is increased as the method to increase the slope compensation, the increased slope results in an increased slope of the compensated current signal. As another example, if the DC bias of the ramp signal is increased as the method to increase the slope compensation, the increased DC bias of the ramp signal results in an increased DC bias of the compensated current signal. However, summing the ramp signal with the signal indicative of the current is but one example of slope compensation in the example circuit.

Figure 4:
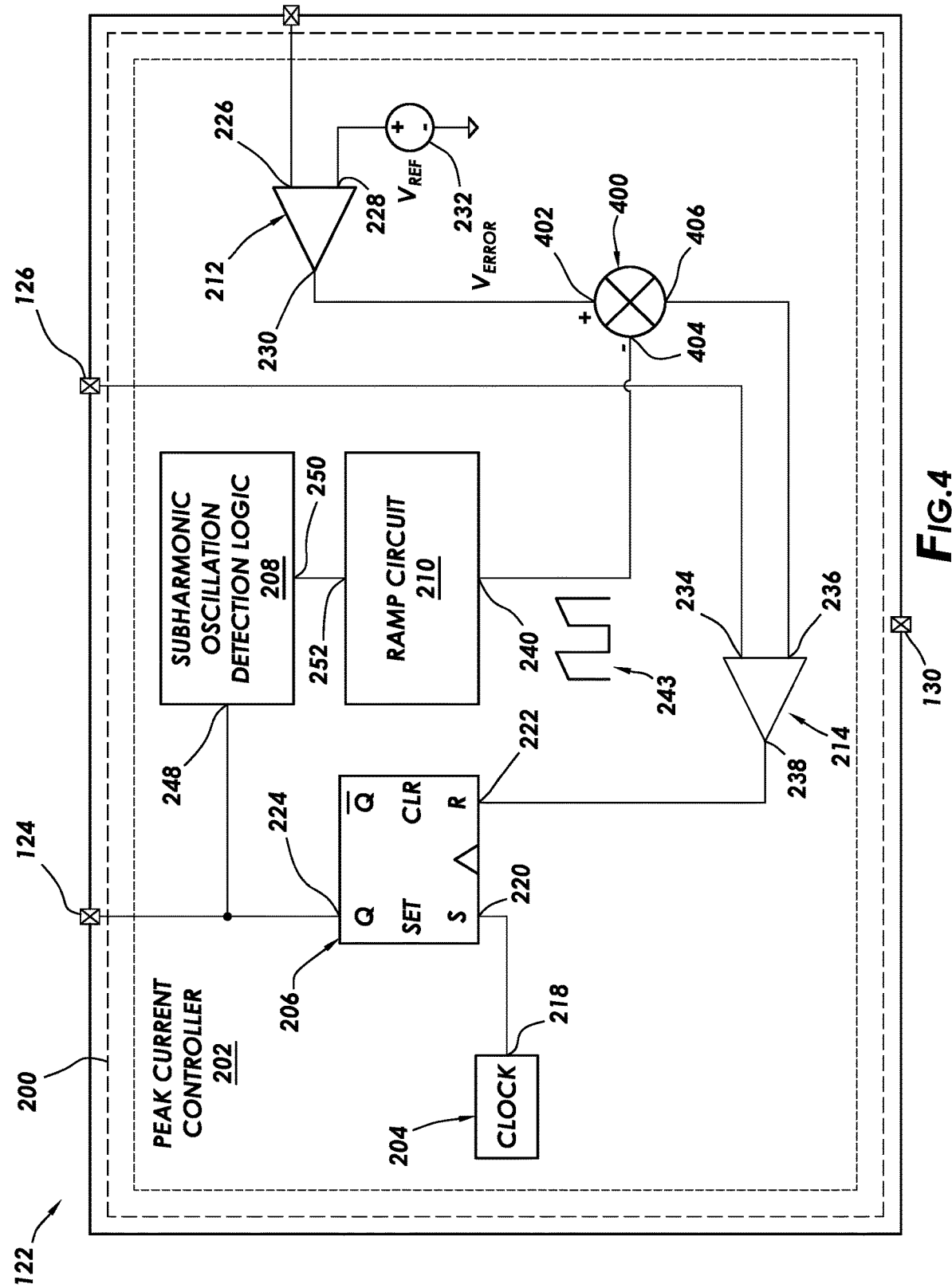
FIG. 4 shows a block diagram of a circuit controller in accordance with at least some embodiments.

FIG. 4 shows a block diagram of a circuit controller in accordance with at least some embodiments. The circuit controller 122 of FIG. 4 is closely related to the circuit controller 122 of FIG. 2; however, in FIG. 4 the location of the slope compensation is modified to show an alternate embodiment. The components of FIG. 4 whose identity and function remain unchanged from FIG. 2 are shown and numbered, but are not described in detail again so as not to unduly lengthen the specification.

In the example of FIG. 4, the slope compensation is implemented by combining the ramp signal with the signal indicative of voltage error produced by the error amplifier 212. In particular, the subtraction block 400 defines a first input 402, a second input 404, and a sum output 406. The first input 402 is coupled to the error output 230 and thus receives the signal indicative of voltage error. The second input 404 is coupled to ramp output 240 and thus receives the ramp signal. The sum output 406 is coupled to the second input 236 of the comparator 214, and first input 234 of the comparator 214 is coupled to the sense terminal 126 and thus receives the signal indicative current through the charge control FET 112. In the example system, subtraction block 400 subtracts the ramp signal on the second input 404 from the signal indicative of voltage error on the first input 402, and drives the resultant to the sum output 406. The resultant created by the subtraction block 400 may thus be considered a compensated error signal. It follows then that example peak current controller 202 of FIG. 4 de-asserts the gate terminal 124 in each period of the switching frequency when a magnitude of the signal indicative of current applied to the first input 234 of the comparator 214 crosses a magnitude of the compensated error signal applied to the second input 236 of the comparator 214. The overall result is effectively the same. In yet still other cases, the ramp signal may be both added to the signal indicative of current and subtracted from the signal indicative of voltage error.

Figure 5:
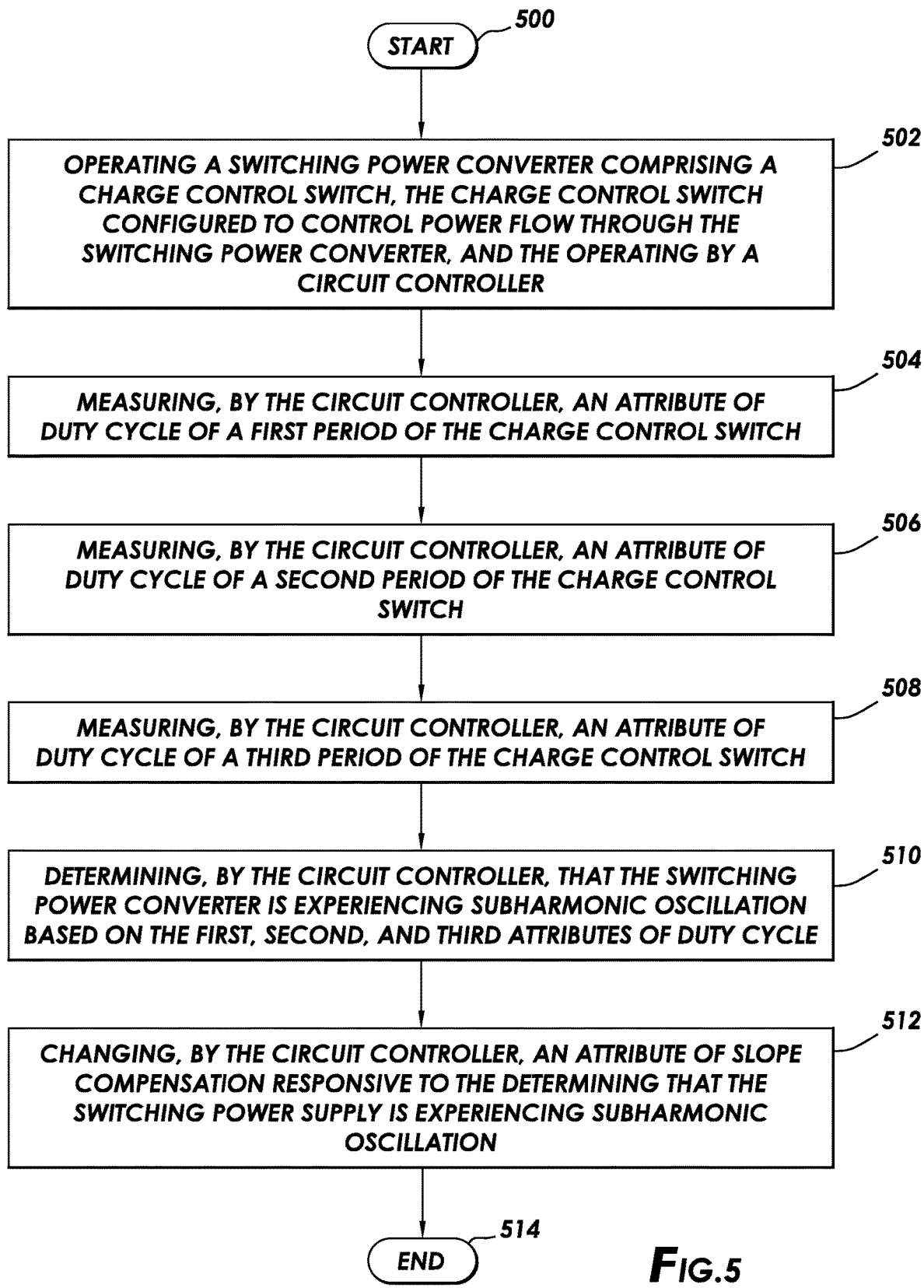
FIG. 5 shows a method in accordance with at least some embodiments.

FIG. 5 shows a method in accordance with at least some embodiments. In particular, the method starts (block 500) and comprises: operating a switching power converter comprising a charge control switch, the charge control switch configured to control power flow through the switching power converter, and the operating by a circuit controller (block 502); measuring, by the circuit controller, an attribute of duty cycle of a first period of the charge control switch (block 504); measuring, by the circuit controller, an attribute of duty cycle of a second period of the charge control switch (block 506); measuring, by the circuit controller, an attribute of duty cycle of a third period of the charge control switch (block 508); determining, by the circuit controller, that the switching power converter is experiencing subharmonic oscillation based on the first, second, and third attributes of duty cycle (block 510); and changing, by the circuit controller, an attribute of slope compensation responsive to the determining that the switching power supply is experiencing subharmonic oscillation (block 512). Thereafter, the method ends (block 514).

FIG. 1 shows an example system of the power circuit 110 being controlled by the circuit controller 122. The power circuit 110 is representative of the components of many different types of switching power converters, and thus so too is the circuit controller 122 representative many different setups. The circuit controller 122 may thus be a primary-side controller, a secondary-side controller, or a controller that operates both the primary side and secondary side of the example power circuit 110.

Many of the electrical connections in the drawings are shown as direct couplings having no intervening devices, but not expressly stated as such in the description above. Nevertheless, this paragraph shall serve as antecedent basis in the claims for referencing any electrical connection as "directly coupled" for electrical connections shown in the drawing with no intervening device(s).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method comprising:
   operating a switching power converter comprising a charge control switch and a circuit controller, the charge control switch configured to control power flow through the switching power converter;
   measuring, by the circuit controller, an attribute of duty cycle of a first period of the charge control switch;
   measuring, by the circuit controller, an attribute of duty cycle of a second period of the charge control switch;
   measuring, by the circuit controller, an attribute of duty cycle of a third period of the charge control switch;
   determining, by the circuit controller, that the switching power converter is experiencing subharmonic oscillation based on the attributes of duty cycle of the first, second, and third periods of the charge control switch; and
   changing, by the circuit controller, an attribute of slope compensation responsive to the determining that the switching power converter is experiencing subharmonic oscillation.

2. The method of claim 1 wherein measuring the attributes of duty cycle in the first, second, and third periods of the charge control switch further comprises measuring conduction time of the charge control switch in each of the first, second, and third periods.

3. The method of claim 1 wherein changing the attribute of slope compensation further comprises increasing a slope of a ramp signal added to a current sense signal.

4. The method of claim 1 wherein changing the attribute of slope compensation further comprises increasing a slope of ramp signal subtracted from a voltage error signal.

5. The method of claim 1 wherein the third period is consecutive with the second period, and the second period is consecutive with the first period.

6. The method of claim 1 wherein operating the switching power converter further comprises operating at least one selected from a group comprising: an inductor-capacitor resonant converter; a flyback converter; an isolated buck-type converter; a non-isolated buck-type converter; an isolated boost converter; a non-isolated boost converter; and a buck-boost converter.

7. A circuit controller for a switching power converter, the circuit controller comprising:
   a first drive terminal, a voltage feedback terminal, and a current sense terminal;

a peak current controller coupled to the first drive terminal, the voltage feedback terminal, and the current sense terminal, the peak current controller configured to assert the first drive terminal at a switching frequency, and to de-assert the first drive terminal in each period of the switching frequency based on a signal indicative of current sensed through the current sense terminal, a signal indicative of voltage error created based on a signal sensed through the voltage feedback terminal, and a ramp signal;

the peak current controller configured to sense subharmonic oscillation of the switching power converter based on attributes of duty cycle of the assertions of the first drive terminal over a plurality of periods of the switching frequency; and the peak current controller configured to change an attribute of the ramp signal responsive to detection of the subharmonic oscillation.

8. The circuit controller of claim 7 wherein when the peak current controller changes the attribute of the ramp signal, the peak current controller is further configured to increase a slope of the ramp signal.

9. The circuit controller of claim 7 wherein when the peak current controller de-asserts the first drive terminal, the peak current controller is further configured to:
add the ramp signal to the signal indicative of current thereby creating a compensated current signal; and
de-assert the first drive terminal in each period of the switching frequency when a magnitude of the compensated current signal crosses a magnitude of the signal indicative of voltage error.

10. The circuit controller of claim 7 wherein when the peak current controller de-asserts the first drive terminal, the peak current controller is further configured to:
subtract the ramp signal from the signal indicative of voltage error thereby creating a compensated error signal; and
de-assert the first drive terminal in each period of the switching frequency when a magnitude of the signal indicative of current crosses a magnitude of the compensated error signal.

11. The circuit controller of claim 7 wherein when the peak current controller senses subharmonic oscillation, the peak current controller is further configured to:
measure an attribute of duty cycle of a first period of the switching frequency;
measure an attribute of duty cycle of a second period of the switching frequency;
measure an attribute of duty cycle of a third period of the switching frequency; and
determine that the switching power converter is experiencing subharmonic oscillation based on the attributes of duty cycle of the first, second, and third periods of the switching frequency.

12. The circuit controller of claim 11 wherein when the circuit controller determines that the switching power converter is experiencing subharmonic oscillation, the circuit controller is further configured to make the determination based on a duty cycle in the first period be greater than a duty cycle in the second period, and the duty cycle in the second period being shorter than a duty cycle in the third period.

13. The circuit controller of claim 11 wherein when the circuit controller determines that the switching power converter is experiencing subharmonic oscillations, the circuit controller is further configured to make the determination based on a duty cycle in the first period be less than a duty cycle in the second period, and the duty cycle in the second period being greater than a duty cycle in the third period.

14. The circuit controller of claim 11 wherein the third period is consecutive with the second period, and the second period is consecutive with the first period.

15. A switching power converter comprising:
input voltage nodes and output voltage nodes;
a power circuit coupled between the input voltage nodes and the output voltage nodes, the power circuit having a charge control switch that controls power flow from the input voltage nodes to the output voltage nodes, the charge control switch having a control input;
a circuit controller coupled to the power circuit and configured to sense a signal indicative of current flow through the charge control switch, and configured to sense a signal indicative of voltage on the output voltage nodes, the circuit controller configured to:
assert the control input of the charge control switch at a switching frequency;
de-assert the control input of the charge control switch in each period of the switching frequency based on the signal indicative of current flow through the charge control switch, a signal indicative of voltage error created based on the signal indicative of voltage on the output voltage nodes, and a ramp signal;
sense subharmonic oscillation of the power circuit based on attributes of duty cycle of the assertions of the control input of the charge control switch over a plurality of periods of the switching frequency; and
increase slope compensation based on detection of subharmonic oscillation.

16. The switching power converter of claim 15 wherein when the circuit controller increases slope compensation, the circuit controller is further configured to increase a slope of the ramp signal.

17. The switching power converter of claim 15 wherein when the circuit controller de-asserts the control input of the charge control switch, the circuit controller is further configured to:
add the ramp signal to the signal indicative of current flow through the charge control switch to create a compensated current signal; and
de-assert the control input of the charge control switch in each period of the switching frequency when a magnitude of the compensated current signal crosses a magnitude of the signal indicative of voltage error.

18. The switching power converter of claim 15 wherein when the circuit controller de-asserts the control input of the charge control switch, the circuit controller is further configured to:
subtract the ramp signal from the signal indicative of voltage error to thereby create a compensated error signal; and
de-assert the control input of the charge control switch in each period of the switching frequency when a magnitude of the signal indicative of current flow through the charge control switch crosses a magnitude of the compensated error signal.

19. The switching power converter of claim 15 wherein when the circuit controller senses subharmonic oscillation, the circuit controller is further configured to:
measure an attribute of duty cycle of a first period of the switching frequency;
measure an attribute of duty cycle of a second period of the switching frequency;
measure an attribute of duty cycle of a third period of the switching frequency; and determine that the switching power converter is experiencing subharmonic oscillation based on the attributes of duty cycle of the first, second, and third periods of the switching frequency.

20. The switching power converter of claim 19 wherein the third period is consecutive with the second period, and the second period is consecutive with the first period.

* * * * *